United States Patent
Yoshida

(10) Patent No.: US 7,557,463 B2
(45) Date of Patent: Jul. 7, 2009

(54) IMAGE FORMING APPARATUS HAVING POWER SUPPLY APPARATUS

(75) Inventor: Katsuyuki Yoshida, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 331 days.

(21) Appl. No.: 11/167,347

(22) Filed: Jun. 27, 2005

(65) Prior Publication Data

US 2005/0286925 A1 Dec. 29, 2005

(30) Foreign Application Priority Data

Jun. 29, 2004 (JP) ............................ 2004-191123

(51) Int. Cl.
*H02J 3/14* (2006.01)
(52) U.S. Cl. ...................................... 307/39
(58) Field of Classification Search ............ 307/39
See application file for complete search history.

(56) References Cited

U.S. PATENT DOCUMENTS 6,552,447 B1 * 4/2003 Fuse ............................ 307/68
6,795,322 B2 * 9/2004 Aihara et al. ................. 363/37

FOREIGN PATENT DOCUMENTS

| JP | 61-288747 | 12/1986 |
| JP | 1-129725 | 5/1989 |
| JP | 7-111741 | 4/1995 |
| JP | 9-200974 | 7/1997 |

OTHER PUBLICATIONS

Patent Abstracts of Japan, Publication No. 01-129725, Publication Date: May 23, 1989, 1 page.
Patent Abstracts of Japan, Publication No. 09-200974, Publication Date: Jul. 31, 1997, 1 page.
Patent Abstracts of Japan, Publication No. 07-111741, Publication Date: Apr. 25, 1995, 1 page.
Partial Translation of Japanese Patent Laying-Open No. 61-288747, Date of Laying-Open: Dec. 18, 1986, 3 pages.

* cited by examiner

*Primary Examiner*—Fritz M Fleming
*Assistant Examiner*—Dru M Parries
(74) *Attorney, Agent, or Firm*—Osha • Liang LLP

(57) ABSTRACT

When an interruption of an AC power supply occurs, an interruption detection circuit detects the interruption to output a detection signal ("H" level). In response to input of the detection signal, a coupling unit electrically couples power supply nodes. Accordingly, based on electric charge stored by capacitors, a low voltage can be supplied for a predetermined period of time. Using the electrolytic capacitors already provided in the circuitry, supply of the voltage can be continued for a predetermined period of time and thus the occupied area can be reduced.

2 Claims, 4 Drawing Sheets

IMAGE FORMING APPARATUS HAVING POWER SUPPLY APPARATUS

BACKGROUND OF THE INVENTION

1. Field of the Invention

The present invention relates to a backup power supply of a power supply circuit used for an image forming apparatus.

2. Description of the Background Art

In general, when supply of electric power to a system abruptly stops due to an interruption of power supply for example, it is desirable to stably stop the system while preventing any malfunction for example of the system.

Regarding personal computers for example, when a circuit breaker abruptly trips due to an interruption of power supply for example, generally a so-called backup power supply that detects the breaker's tripping to temporality supply electric power for continuing the power supply is used to prevent data for example that has been being generated from breaking.

In particular, in recent years, a backup power supply that uses an uninterruptible power supply (UPS) to prevent loss of memory contents or a malfunction of a personal computer for example has been of great interest. Japanese Patent Laying-Open Nos. 01-129725 and 09-200974 each disclose a configuration having, in addition to a power supply circuit used in a normal state, a backup power supply circuit that can temporarily supply electric power in an emergency state, for example, when an interruption of power supply occurs, for continuing supply of desired electric power to a certain extent in such an emergency state as the interruption.

The disclosed configuration, however, includes, in addition to the normal power supply circuit, the backup power supply circuit, a storage battery for example, used when an interruption occurs, which means that an additional dedicated circuit is necessary, resulting in a problem in terms of the occupied area and cost.

In particular, in these days, most image forming apparatuses, printers for example, are configured to have various functions including a CPU (central processing unit) and accordingly require a larger area, and thus it is an important issue to reduce the area.

SUMMARY OF THE INVENTION

The present invention is made for solving the aforementioned problems, and an object of the present invention is to provide an image forming apparatus having a power supply apparatus that can secure electric power for a predetermined time when a power interruption occurs, without having a dedicated backup power supply circuit and thereby reducing the occupied area.

According to an aspect of the present invention, an image forming apparatus executing image forming processing in response to input from an AC power supply includes: a drive unit used for executing at least one of a mechanical operation and a heating operation that are included in the image forming processing; a control unit including a memory storing information for controlling the drive unit; and a power supply circuit for supplying a DC voltage to the drive unit and to the control unit that consumes less power than the drive unit, in response to input from the AC power supply. The power supply circuit includes: a first power supply unit supplying a first voltage to a first power supply node in association with the drive unit; a second power supply unit supplying a second voltage lower than the first voltage to a second power supply node in association with the control unit; a coupling unit for electrically coupling the first power supply node and the second power supply node respectively of the first power supply unit and the second power supply unit, when an interruption of the AC power supply occurs; a detection unit for detecting the interruption of the AC power supply to output a detection signal; a third power supply unit supplying a predetermined voltage to a third power supply node in association with the detection unit; and a shutoff circuit electrically shutting off a passage for supply to the drive unit when the interruption of the AC power supply occurs. The first power supply unit and the second power supply unit have respective electrolytic capacitors provided between the first power supply node and the second power supply node respectively and a fixed voltage. The detection unit outputs the detection signal based on a comparison between a voltage level of the predetermined voltage supplied to the third power supply node and a reference voltage level. The coupling unit electrically couples the first power supply node and the second power supply node according to the detection signal. When the interruption of the AC power supply occurs, the second voltage is supplied for a predetermined period of time to the control unit based on electric charge stored by respective electrolytic capacitors of the first power supply unit and the second power supply unit. When the interruption of the AC power supply occurs, the control unit receives the detection signal that is output from the detection unit to carry out a predetermined operation for protecting the information stored by the memory for the predetermined period of time.

According to another aspect of the present invention, an image forming apparatus executing image forming processing in response to input from an AC power supply includes a power supply circuit for supplying a DC voltage to a first load and to a second load that consumes less power than the first load, in response to input from the AC power supply. The power supply circuit includes: a first power supply unit supplying a first voltage to a first power supply node in association with the first load; a second power supply unit supplying a second voltage lower than the first voltage to a second power supply node in association with the second load; and a coupling unit for electrically coupling the first power supply node and the second power supply node respectively of the first power supply unit and the second power supply unit, when an interruption of the AC power supply occurs. The first power supply unit and the second power supply unit have respective electrolytic capacitors provided between the first power supply node and the second power supply node respectively and a fixed voltage. When the interruption of the AC power supply occurs, the second voltage is supplied for a predetermined period of time to the second load based on electric charge stored by respective electrolytic capacitors of the first power supply unit and the second power supply unit.

Preferably, the power supply circuit further includes a detection unit for detecting the interruption of the AC power supply to output a detection signal, and the coupling unit electrically couples the first power supply node and the second power supply node according to the detection signal.

In particular, the power supply circuit further includes a third power supply unit supplying a predetermined voltage to a third power supply node in association with the detection unit, and the detection unit outputs the detection signal based on a comparison between a voltage level of the predetermined voltage supplied to the third power supply node and a reference voltage level.

Preferably, the first load corresponds to a drive unit used for executing at least one of a mechanical operation and a heating operation included in the image forming processing, the second load corresponds to a control unit including a memory storing information for controlling the drive unit and, when the interruption of the AC power supply occurs, the control unit carries out a predetermined operation for protecting the information stored by the memory for the predetermined period of time.

In particular, the power supply circuit further includes a detection unit for detecting the interruption of the AC power supply to output a detection signal, the coupling unit electrically couples the first power supply node and the second power supply node according to the detection signal, and the control unit receives the detection signal that is output from the detection unit to carry out the predetermined operation.

Preferably, the power supply circuit further includes a shut-off circuit electrically shutting off a passage for supply to the first load when the interruption of the AC power supply occurs.

In the image forming apparatus according to the present invention, when an interruption of the AC power supply occurs, the coupling unit electrically couples the first and second power supply nodes to supply the second voltage to the second load for a predetermined period of time based on electric charge stored by respective electrolytic capacitors of the first and second power supply units. Thus, the electrolytic capacitors already provided in the circuit are used to continue supply of the second voltage for the predetermined period of time, and accordingly the occupied area can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
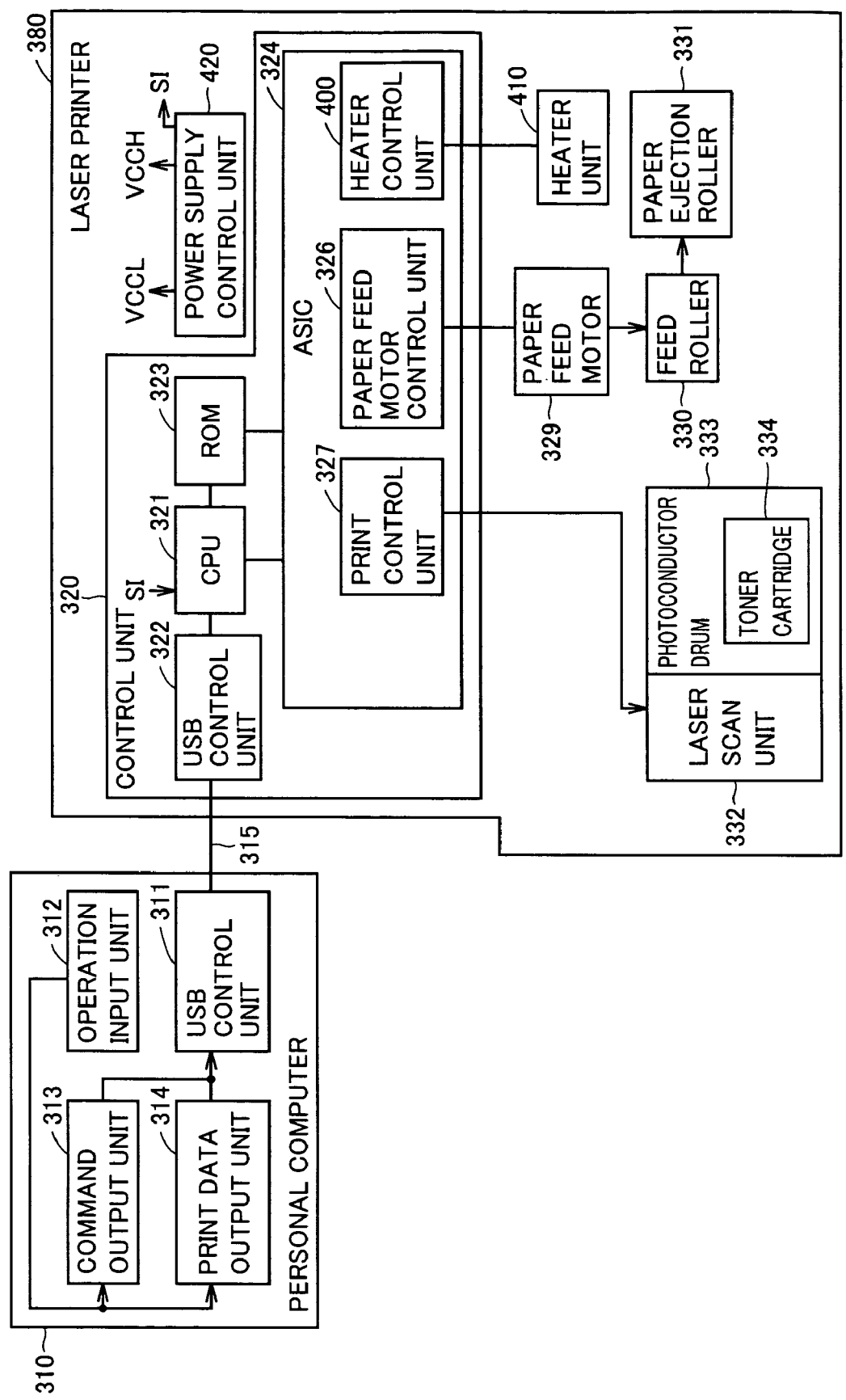
FIG. 1 shows a configuration of an image forming apparatus according to an embodiment of the present invention.

An embodiment of the present invention is hereinafter described in detail with reference to the drawings. In the drawings, like components are denoted by like reference characters and a description thereof is not herein repeated.

Referring to FIG. 1, a personal computer 310 is a device for controlling a laser printer 380 that is an image forming apparatus according to the embodiment of the present invention, and includes a USB control unit 311, an operation input unit 312, a command output unit 313 and a print data output unit 314.

Operation input unit 312 receives from a user an instruction to print. Print data output unit 314 is implemented using a program and a CPU that executes the program and outputs print data. Command output unit 313 is implemented using a program and a CPU that executes the program and outputs such various commands as a paper feed command, a print start command and a paper ejection command. USB control unit 311 outputs these various commands including the paper feed command, print start command and paper ejection command as well as the print data to a USB cable 315.

Laser printer 380 includes a control unit 320, a power supply control unit 420, a laser scan unit (LSU) 332, a photoconductor drum 333, a toner cartridge 334, a paper feed motor 329, a feed roller 330, a paper ejection roller 331, and a heater unit 410.

Control unit 320 is comprised of a CPU 321, a USB control unit 322, a ROM 323, and an ASIC 324. ROM 323 stores a program executed by CPU 321. USB control unit 322 receives such various commands as the paper feed command, print start command and paper ejection command as well as the print data that are transmitted through USB cable 315 from personal computer 310.

ASIC 324 is comprised of a paper feed motor control unit 326, a print control unit 327 and a heater control unit 400. Heater control unit 400 controls heater unit 410 in response to an instruction from the CPU. Heater unit 410 controls the temperature of a hot roller (not shown) for so-called thermal fixing.

Paper feed motor control unit 326 controls drive of paper feed motor 329. Paper feed motor 329 drives feed roller 330 to convey print paper. As feed roller 330 rotates, the rotations are transmitted to and rotate paper ejection roller 331 to convey the fed print paper.

Receiving the paper feed command, CPU 321 instructs paper feed motor control unit 326 to drive paper feed motor 329.

Receiving print data together with the print start command, CPU 321 outputs the print data to laser scan unit 332 in response to an instruction from print control unit 327. Laser scan unit 332 emits a laser beam according to a print image to photoconductor drum 333. Accordingly, a latent image is formed on photoconductor drum 333 according to the print image. Photoconductor drum 333 with the latent image formed thereon is rotated and a toner is applied from toner cartridge 334 onto photoconductor drum 333. Then, the toner is attached onto photoconductor drum 333 with a pattern corresponding to the print image. After this, paper is brought into contact with photoconductor drum 333 to transfer the pattern on photoconductor drum 333 onto the paper. Specifically, the so-called hot roller (not shown) heated by heater unit 410 is used for thermal fixing to transfer the pattern onto the paper.

Receiving the paper ejection command, CPU 321 instructs paper feed motor control unit 326 to drive paper feed motor 329 and rotate feed roller 330 and paper ejection roller 331, thereby ejecting the print paper.

Power supply control unit 420 receives a commercial AC voltage to generate a voltage used in the internal circuitry. In this embodiment, an example is shown where a low voltage VCCL used in control unit 320 and a high voltage VCCH used in drive-related circuitry (drive unit) except for control unit 320 are generated. High voltage VCCH is used for example in the motor and heater. Specifically, in the present embodiment, low voltage VCCL is supplied to control unit 320 performing internal processing included in image forming processing and consuming relatively smaller power. High voltage VCCH is supplied to internal circuits performing such operations consuming relatively lager power as mechanical and heating operations that are included in the image forming processing. In the present embodiment, in general, when a commercial AC voltage of 100 V is supplied, for example, a high voltage VCCH (36 V) and a low voltage VCCL (5 V) are supplied.

Further, power supply control unit 420 detects an interruption upon occurrence of the interruption to output a detection signal SI ("H" level) indicating the fact of the detection.

CPU 321 receives this detection signal SI ("H" level) supplied thereto to perform a predetermined operation for preventing a malfunction for example of the circuitry. Specifically, following a predetermined procedure, CPU 321 instructs to select a stop or ending mode for stopping such an operation as access of an internal circuit of laser printer 380, ROM 323 for example. Accordingly, laser printer 380 can stably stop its operation.

Figure 2:
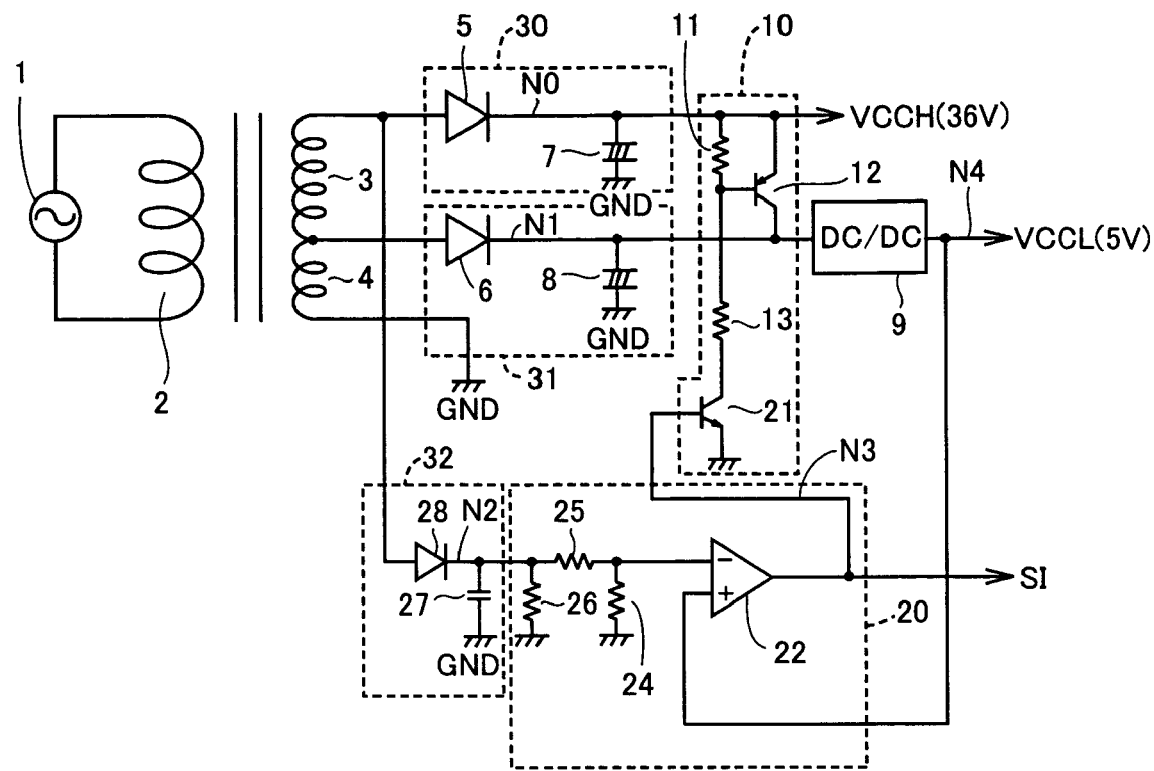
FIG. 2 shows a circuit configuration of a power supply control unit according to the embodiment of the present invention.

Referring to FIG. 2, power supply control unit 420, according to the embodiment of the present invention, includes an AC power supply 1 supplying AC electric power, a primary coil 2, secondary coils 3, 4, power supply units 30-32, a coupling unit 10, an interruption detection unit 20, and a DC/DC converter 9.

An AC voltage is supplied from AC power supply 1 to primary coil 2 and an AC voltage is generated from secondary coils 3, 4 according to the turns ratio thereof.

The AC voltage generated from secondary coils 3, 4 is converted into a DC voltage by power supply units 30-32. Specifically, the AC voltage is full-wave rectified by a diode and further converted by a smoothing capacitor (electrolytic capacitor) into a smoothed DC voltage. Power supply unit 30 is constituted of a diode 5 and a smoothing capacitor 7 to supply high voltage VCCH (36 V) to a power supply node N0 (also referred to simply as node N0). Power supply unit 31 is constituted of a diode 6 and a smoothing capacitor 8 to supply a low voltage (7 V) to a power supply node N1 (also referred to simply as node N1). DC/DC converter 9 further reduces the voltage (7 V) supplied to node N1 to output voltage VCCL (5 V) to a node N4. Power supply unit 32 is constituted of a diode 28 and a smoothing capacitor 27 to supply high voltage VCCH to a power supply node N2 (also referred to simply as node N2). Power supply unit 32 is provided to supply the voltage to interruption detection circuit 20 for detecting an interruption.

Interruption detection circuit 20 includes a comparator 22 and resistors 24-26.

Resistor 26 placed between node N2 and a ground voltage (fixed voltage) GND is provided as a discharge resistor for discharging electric charge stored in capacitor 27. Resistor 25 is placed between node N2 and one input (− (minus) input) of comparator 22. Resistor 24 is provided between the one input of comparator 22 and ground voltage GND. Comparator 22 compares the voltage on node N2 that is input through resistor 25 to the one input (−input) with the voltage on node N4 that is input to the other input (+ (plus) input) to output detection signal SI according to the result of the comparison. In this configuration, high voltage VCCH supplied to node N2 is voltage-divided by resistors 24, 25 into a predetermined voltage level to be supplied to the one input (−input) of comparator 22. Here, resistors 24, 25 are designed to allow the voltage supplied to the one input (−input) of comparator 22 to be higher than low voltage VCCL (5 V) on node N4.

Thus, when no interruption occurs, since the other input (+input) is lower in voltage level than the one input (−input), detection signal SI output from comparator 22 that indicates the result of the comparison is set at "L" level. In the above-described configuration, a predetermined voltage generated by reducing high voltage VCCH is compared with low voltage VCCL serving as a reference voltage and detection signal SI indicating the result of the comparison is output. The configuration is not limited to this one. Specifically, a voltage or the like generated on another power supply node may be used under the condition that the level of this voltage becomes higher or lower than a reference voltage depending on whether an interruption occurs or not and detection signal SI ("H" level) is output accordingly.

Coupling unit 10 includes transistors 12, 21 and resistors 11, 13.

Transistor 12 has its emitter connected to node N0, its collector connected to node N1 and its base connected through resistor 11 to node N0. Transistor 21 has its emitter connected to ground voltage GND, its collector connected through resistor 13 to the base of transistor 12 and its base connected to node N3. As described above, when no interruption occurs, detection signal SI is set at "L" level. In other words, the voltage level on node N3 is "L" level. Thus, transistor 21 is turned off so that the emitter-corrector current does not flow transistor 21. Accordingly, the base current of transistor 12 does not flow so that transistor 12 is turned off and node N0 and node N1 are electrically disconnected from each other.

Figure 3:
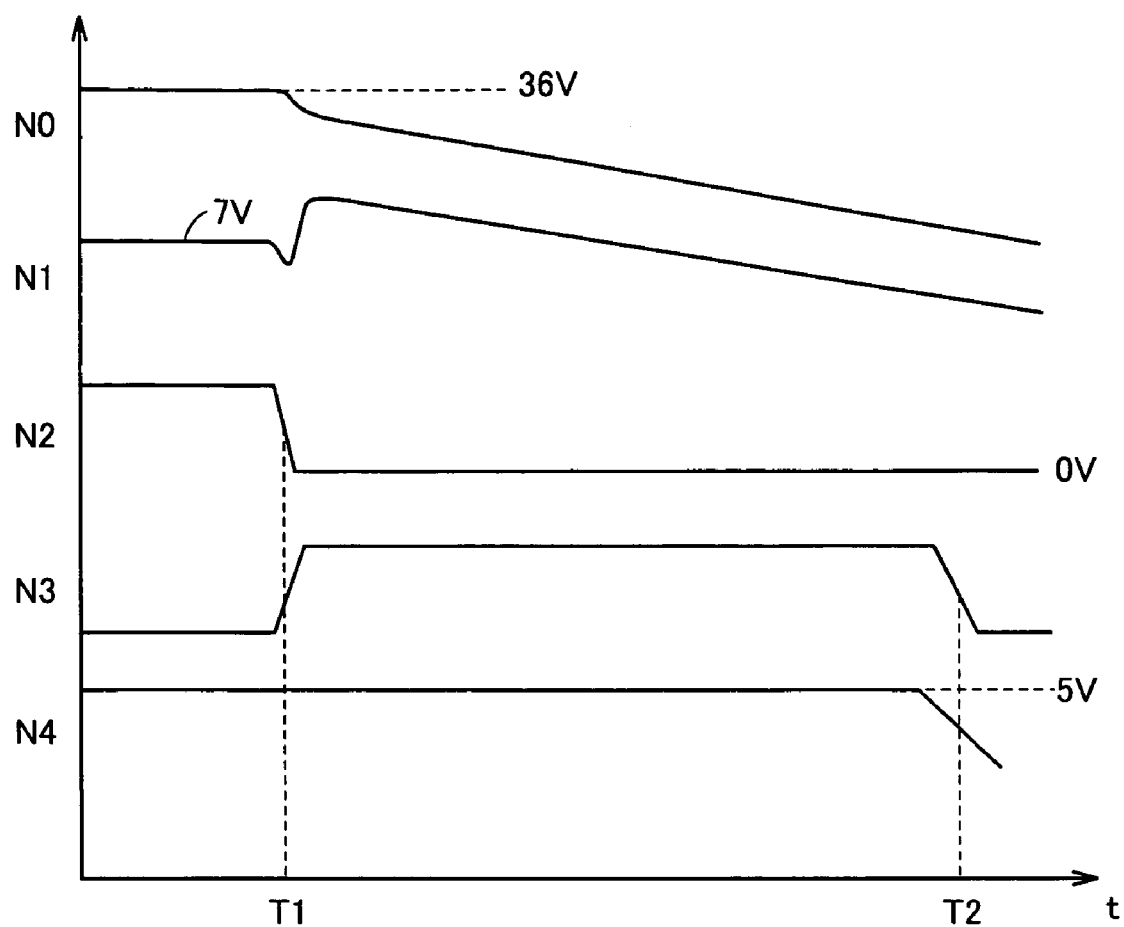
FIG. 3 is a timing chart illustrating an operation of the power supply control unit when an interruption occurs.

With reference to a timing chart in FIG. 3, an operation of power supply control unit 420 when an interruption occurs is described.

It is supposed that, at time T1, an interruption occurs to cause the voltage from AC power supply 1 to decrease. Then, generation of the AC voltage by secondary coils 3, 4 is stopped. Accordingly, the voltage level on node N2 sharply decreases due to discharge resistor 26. Accordingly, the relation between the voltage level on the one input (−input) and the voltage level on the other input (+input) of comparator 22 is reversed, namely the voltage level on the other input (+input) becomes higher than the voltage level on the one input (−input), and thus detection signal SI is set at "H" level. Accordingly, transistor 21 is turned on to allow collector-emitter current to flow. As the base current also flows through transistor 12, transistor 12 is turned on to electrically couple node N0 and node N1.

After time T1, the voltage level on node N1 decreases due to the stop of generation of the AC voltage. However, transistor 12 is turned on and node N0 and node N1 are electrically coupled so that the voltage level on node N1 is increased to a predetermined voltage level. Based on the amount of charge stored by smoothing capacitors 7, 8, supply of low voltage VCCL through DC/DC converter 9 is continued for a predetermined period of time (at least 200 m sec).

At time T2, the voltage level on node N4 decreases below 5 V and accordingly the supply of low voltage VCCL cannot be continued.

Power supply unit 420 in this embodiment electrically couples in parallel smoothing capacitor 7 provided for supplying high voltage VCCH and smoothing capacitor 8 provided for supplying low voltage VCCL so that supply of low voltage VCCL can be continued for a predetermined period of time. In particular, as compared with smoothing capacitor 8, smoothing capacitor 7 that supplies high voltage VCCH stores a larger amount of charge according to the level of the high voltage.

When an interruption occurs while data is being processed so that supply of the voltage to control unit 320 stops, the data processing becomes impossible and further, program information recorded on ROM 323 used for the data processing would be broken and accordingly become impossible to restore.

In contrast, the configuration here can be used to keep supply of the voltage for a predetermined period of time (at least 200 msec) and immediately make a transition to a stop or ending mode of the apparatus, thereby preventing a malfunction of the circuitry and protecting the program information stored therein. In general, since the period of 100 msec to 200 msec is enough to prevent the circuitry from malfunctioning and stop the circuit operation in stable manner. The present invention sufficiently ensures this period of time.

Figure 4:
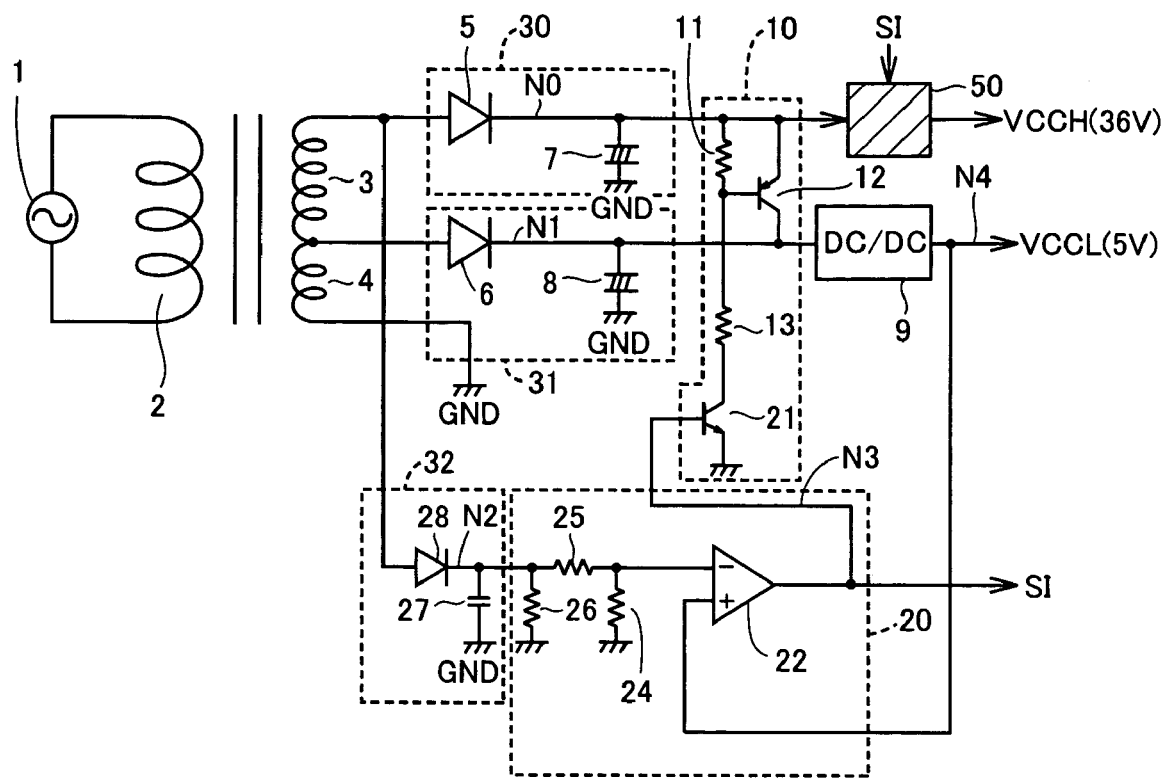
FIG. 4 shows a circuit configuration of another power supply control unit according to the embodiment of the present invention.

FIG. 4 shows a configuration of another power supply control unit according to the embodiment of the present invention.

Referring to FIG. 4, the configuration shown differs from that in FIG. 2 in that the former further includes a shutoff unit 50. They are identical in other features and the detailed description thereof is not repeated here.

Shutoff unit 50 electrically shuts off the passage of high voltage VCCH supplied from node N0 in response to detection signal SI.

Accordingly, electric power consumed by the circuitry connected to node N0 can be reduced when an interruption occurs to continue supply of low voltage VCCL for a longer predetermined period of time.

Although the description above concerns the laser printer, the present invention is applicable as well to any of other image forming apparatuses, inkjet printer, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus executing image forming processing in response to input from an AC power supply, comprising:
  a drive unit used for executing at least one of a mechanical operation and a heating operation that are included in said image forming processing;
  a control unit including a memory storing information for controlling said drive unit; and
  a power supply circuit for supplying a DC voltage to said drive unit and to said control unit that consumes less power than said drive unit, in response to input from said AC power supply, wherein
  said power supply circuit includes:
  a first power supply unit supplying a first voltage to a first power supply node in association with said drive unit;
  a second power supply unit supplying a second voltage lower than said first voltage to a second power supply node in association with said control unit;
  a coupling unit for electrically coupling said first power supply node and said second power supply node respectively of said first power supply unit and said second power supply unit, when an interruption of said AC power supply occurs;
  a detection unit for detecting the interruption of said AC power supply to output a detection signal;
  a third power supply unit supplying a predetermined voltage to a third power supply node in association with said detection unit; and
  a shutoff circuit electrically shutting off a passage for supply to said drive unit when the interruption of said AC power supply occurs,
  said first power supply unit and said second power supply unit have respective electrolytic capacitors provided between said first power supply node and said second power supply node respectively and a fixed voltage,
  said detection unit outputs said detection signal based on a comparison between a voltage level of said predetermined voltage supplied to said third power supply node and a reference voltage level,
  said coupling unit electrically couples said first power supply node and said second power supply node according to said detection signal,
  when the interruption of said AC power supply occurs, said second voltage is supplied for a predetermined period of time to said control unit based on electric charge stored by respective electrolytic capacitors of said first power supply unit and said second power supply unit, and
  when the interruption of said AC power supply occurs, said control unit receives said detection signal that is output from said detection unit to carry out a predetermined operation for protecting said information stored by said memory for said predetermined period of time.

2. An image forming apparatus executing image forming processing in response to input from an AC power supply,
  said image forming apparatus comprising a power supply circuit for supplying a DC voltage to a first load and to a second load that consumes less power than said first load, in response to input from said AC power supply, wherein
  said power supply circuit includes:
  a first power supply unit supplying a first voltage to a first power supply node in association with said first load;
  second power supply unit supplying a second voltage lower than said first voltage to a second power supply node in association with said second load; and
  a coupling unit for electrically coupling said first power supply node and said second power supply node respectively of said first power supply unit and said second power supply unit, when an interruption of said AC power supply occurs,
  said first power supply unit and said second power supply unit have respective electrolytic capacitors provided between said first power supply node and said second power supply node respectively and a fixed voltage, and
  when the interruption of said AC power supply occurs, said second voltage is supplied for a predetermined period of time to said second load based on electric charge stored by respective electrolytic capacitors of said first power supply unit and said second power supply unit, wherein
  said power supply circuit further includes a shutoff circuit electrically shutting off a passage for supply to said first load when the interruption of said AC power supply occurs.

* * * * *